UNITED STATES PATENT OFFICE.

UNO H. HILLMAN, OF NEW YORK, N. Y., ASSIGNOR OF ONE-HALF TO EDWARD EMERSON WATERS, OF SAME PLACE.

PROCESS OF MANUFACTURING ALBUMEN.

SPECIFICATION forming part of Letters Patent No. 250,071, dated November 29, 1881.

Application filed January 3, 1881. Renewed October 12, 1881. (Specimens.)

*To all whom it may concern:*

Be it known that I, UNO HAROLD HILLMAN, of New York, in the county of New York and State of New York, have invented certain new and useful Improvements in the Manufacture of Albumen; and I do hereby declare that the following is a full, clear, and exact description of the invention, which will enable others skilled in the art to which it appertains to make and use the same.

My invention has for its primary object a new and improved process for the manufacture of albumen from the spawn or ova of fish, and incidentally an improvement in manufacture of albumen from any other source, as from hens' eggs or the blood of animals, and as the improvement does not involve any special form of apparatus this application is unaccompanied by any drawing.

Albumen made from any source, but especially from fish ova, is liable to decompose during the process of manufacture, especially in hot weather, unless the process be an extremely rapid one, and this rapidity my invention is intended to accomplish.

The process of manufacture is as follows: The spawn-bags are carefully opened and the spawn separated from the inclosing membrane, after which the spawn is crushed by suitable machinery. The crushed mass is then treated with a sufficient quantity of water to dissolve all the albumen and make the solution thin enough to admit of filtering. The albuminous water is then filtered and the clear solution is placed in a vacuum-pan and brought to a boil under such a vacuum that the temperature shall not exceed 115° Fahrenheit. Although albumen does not coagulate before at 140° Fahrenheit, it is desirable not to allow the temperature to exceed 115° Fahrenheit, as albumen evaporated at that temperature is more easily dissolved.

The process of evaporation may be carried to perfect dryness in the pan, or the thickened mass may be removed and evaporated to dryness in a common evaporating-room.

This process is rapid, cheap, and sure, and the resulting product is of very superior quality and will preserve its properties indefinitely.

I am aware that albumen made from fish-spawn is not new; but,

Having thus described my invention, what I claim as new, and desire to secure by Letters Patent, is—

The herein-described process of manufacturing albumen from fish-spawn, consisting in adding to the crushed spawn sufficient water to dissolve the albumen, and evaporating the albuminous water by boiling under a vacuum at a temperature sufficiently low to prevent coagulation, substantially as described.

In testimony that I claim the foregoing as my own I affix my signature in presence of two witnesses.

UNO HAROLD HILLMAN.

Witnesses:
   CORNELIUS A. RUNKLE,
   FREDERIC M. ADAMS.